J. A. FREY,

Assignor to C. Riessner & Co.

COAL-OIL STOVE.

No. 7,751.

Reissued June 19, 1877.

WITNESSES:

Jas. E. Hutchinson.

Henry C. Hazard.

INVENTOR.

John A. Frey, by

Prindle and Hopkins his Attys.

N. PETERS, PHOTO-LITHOGRAPHER, WASHINGTON, D. C.

J. A. FREY,
Assignor to C. Riessner & Co.
COAL-OIL STOVE.

No. 7,751.

Reissued June 19, 1877.

WITNESSES.
Jas. E. Hutchinson.
Henry C. Hazard

INVENTOR.
John A. Frey, by
Prindle and Leslie Attys.

N. PETERS, PHOTO-LITHOGRAPHER, WASHINGTON, D. C.

J. A. FREY,

Assignor to C. Riessner & Co.

COAL-OIL STOVE.

No. 7,751.

Reissued June 19, 1877.

WITNESSES.

Jas. B. Hutchinson

Henry C. Hazard

INVENTOR.

John A. Frey, by

Prindle and Lyons Attys.

N. PETERS, PHOTO-LITHOGRAPHER, WASHINGTON, D. C.

UNITED STATES PATENT OFFICE.

JOHN A. FREY, OF NEW YORK, N. Y., ASSIGNOR, BY MESNE ASSIGNMENTS, TO C. RIESSNER & CO., OF SAME PLACE.

IMPROVEMENT IN COAL-OIL STOVES.

Specification forming part of Letters Patent No. 156,149, dated October 20, 1874; reissue No. 7,751, dated June 19, 1877; application filed May 24, 1877.

*To all whom it may concern:*

Be it known that I, JOHN A. FREY, of New York, New York county and State of New York, did invent certain new and useful Improvements in Coal-Oil Stove, for which Letters Patent No. 156,149 were issued to me upon the 20th day of October, 1874, which Letters Patent having been found defective, in that the specification and claims do not cover and embrace all of the original invention, as set forth in the application filed in the Patent Office on the 8th day of July, 1874:

Now, therefore, being desirous of reissuing said Letters Patent, herewith surrendered, I have prepared and do hereby declare that the following is a full, clear, and exact description of the said invention, reference being had to the accompanying drawings, making a part of this invention, in which—

Figure 1:
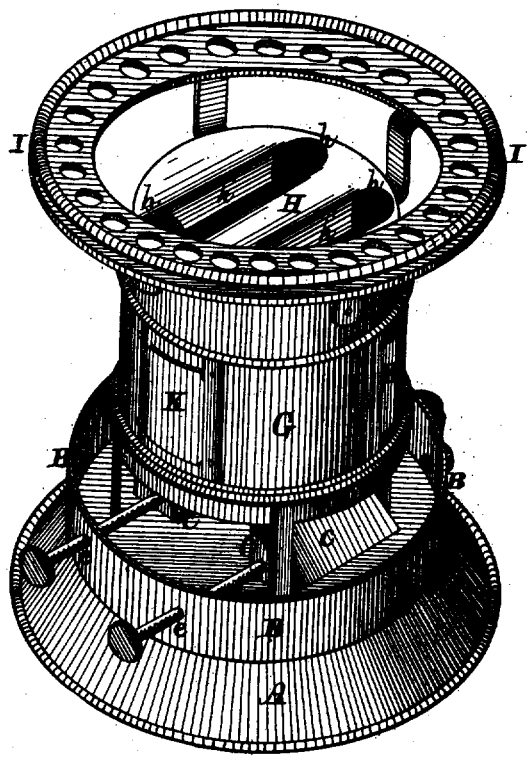
Figure 2:
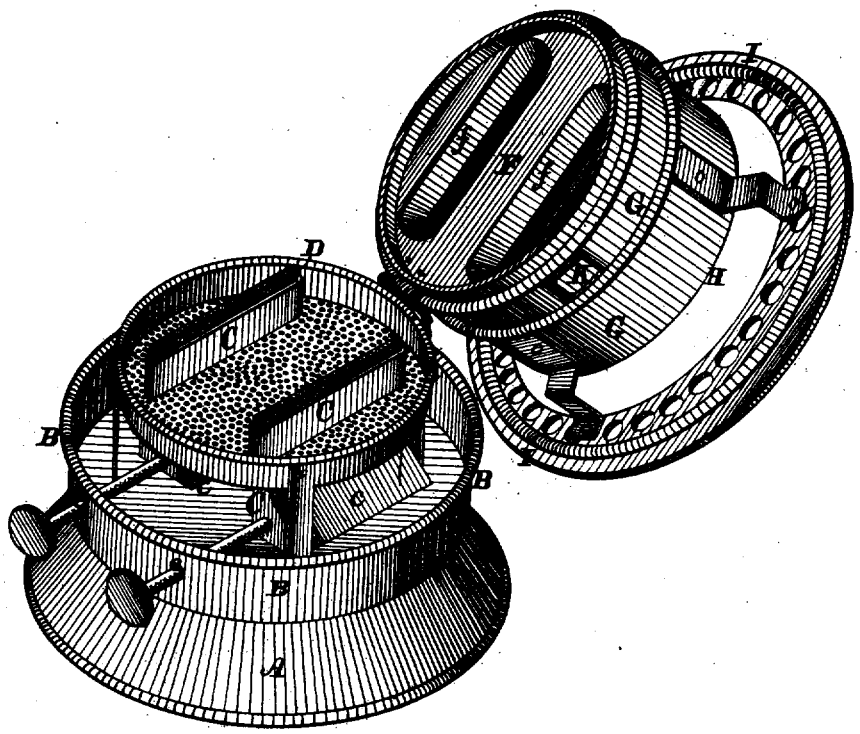
Figure 3:
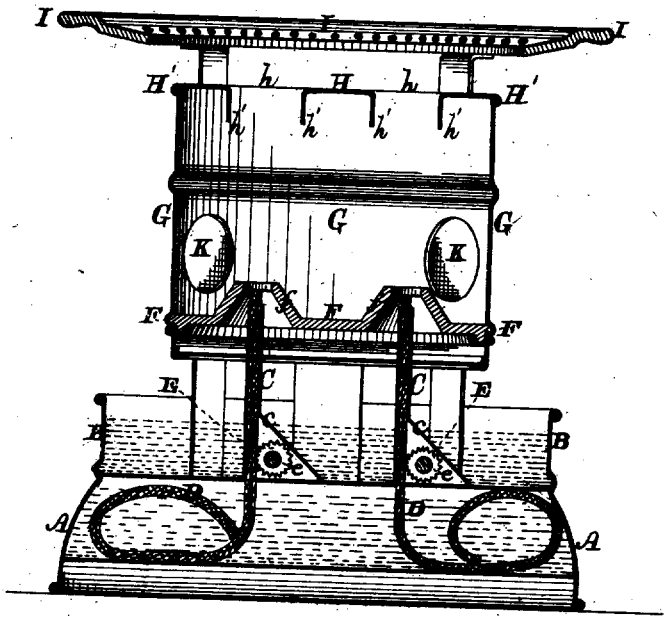

Figure 1 is a perspective view of my stove as arranged for use. Fig. 2 is a like view of the same with the upper hinged portion turned to one side so as to uncover the wick-tubes, and Fig. 3 is a vertical central section upon a line having a right angle to said tubes.

Letters of like name and kind refer to each part in each of the figures.

My invention is an improvement upon a similar device which has before been manufactured and sold by me, and which is protected by several patents; and it consists, principally, in a coal-oil stove having its wick-wheels, wick-wheel shafts, and the entire upper surface of its oil-reservoir covered by a water-reservoir, substantially as and for the purpose hereinafter specified. It consists, further, in a coal-oil stove in which the entire upper surface of its oil-reservoir is protected by a water-reservoir, and its wick-wheels and their shafts are inclosed by means of housings that are within said water-reservoir, and below its upper edge, substantially as and for the purpose hereinafter shown. It consists, finally, in the peculiar construction of the funnel or chimney and its combination with the wick-tubes, substantially as and for the purpose hereinafter set forth.

In the annexed drawings, A represents a reservoir for containing oil, which reservoir has, preferably, downward and outward flaring sides, and at its upper side and outer edge is inclosed by means of an annular flange, B, that has a height of about one and one-half inch, and is used to contain water for receiving the heat radiated downward from the burners, so as to prevent the same from being communicated to the oil.

From the reservoir A, two tubes, C and C, extend upward to the required distance, and serve to contain wicks D and D, of usual shape. Said wicks are moved vertically by means of star-wheels, E and E, which latter are secured upon and rotate with suitable shafts, *e* and *e*.

In order that the wick-wheel shafts *e* and *e* may be prevented from becoming warped by the action of the heat so as thereby to change the relative positions of the wick and engaging-wheel, said wheels are located within a suitable housing, *c*, below the water-line, while said shafts are each contained within a tube, *c'*, that at its inner end communicates with said housing *c*, and at its outer end passes through the flange B that forms the outer wall of the water-reservoir, by which means a perfect protection is afforded and all liability to derangement is avoided.

Above and around the upper ends of the wick-tubes C and C is placed a cap, F, that is provided with cone-shaped kerbs *f* and *f*, one of which coincides with each of said tubes and permits the flame of the burning oil to pass upward from the wick.

From the cap F, which is preferably constructed from cast metal, a sheet-metal cylinder, G, extends upward about seven inches, and at its upper end is inclosed by a metal head, H, which latter is provided with two openings, *h* and *h*, that coincide in position with the wick-tube kerbs *f* and *f*, but have considerably larger horizontal dimensions.

From each side of each opening *h* a flange, *h'*, extends downward, and causes the heated escaping gases to be deflected toward the ends of said opening, instead, as would otherwise be the case, of passing outward, principally at the longitudinal center of the same.

The cylinder G, cap F, and head H, which form the chimney of the lamp, are hinged so as to permit of being turned to one side, as shown in Fig. 2. An elevated support, I, for cooking utensils is secured to the upper end of said cylinder, and a number of glazed openings, K and K, are provided in the sides of the latter, completing the apparatus, the operation of which will be readily understood from the foregoing description.

It will be seen that, in consequence of the construction and arrangement of the water-reservoir and of the housings for the wick-wheels and their shafts, a perfect protection from heat is secured for said parts and for the oil-reservoir beneath.

Having thus fully set forth the nature and merits of my invention, what I claim as new is—

1. A coal-oil stove having its wick-wheels, wick-wheel shafts, and the entire upper surface of its oil-reservoir covered by a water-reservoir, substantially as and for the purpose specified.

2. A coal-oil stove in which the entire upper surface of its oil-reservoir is protected by a water-reservoir, and its wick-wheels and their shafts are inclosed by means of housings that are within said water-reservoir and below its upper edge, substantially as and for the purpose shown.

3. The combined cap and chimney, consisting of the cap F, provided with kerbs *f* and *f*, the sheet-metal cylinder G, and the head H, provided with the openings *h* and *h*, and flanges or flue-plates *h'* and *h'*, depending from the sides only of said openings, said parts being constructed and combined to operate in the manner and for the purpose substantially as set forth.

In testimony that I claim the foregoing I hereunto set my hand this 10th day of May, A. D. 1877.

JOHN A. FREY.

Witnesses:

ADAM RIESSNER,
EDWARD COLEEL.